United States Patent
Drocco et al.

(10) Patent No.: US 11,378,939 B2
(45) Date of Patent: Jul. 5, 2022

(54) METHOD TO CONTROL STORES FOR A PROCESSING LINE FOR CONTAINERS THAT WERE PRE-DOSED WITH FLUID PRODUCTS

(71) Applicant: DROMONT S.P.A., Grinzane Cavour (IT)

(72) Inventors: Luca Drocco, Alba (IT); Mario Drocco, Alba (IT)

(73) Assignee: DROMONT S.P.A., Grinzane Cavour (IT)

( * ) Notice: Subject to any disclaimer, the term of this patent is extended or adjusted under 35 U.S.C. 154(b) by 0 days.

(21) Appl. No.: 16/970,912

(22) PCT Filed: Feb. 20, 2019

(86) PCT No.: PCT/IB2019/051363
§ 371 (c)(1),
(2) Date: Aug. 18, 2020

(87) PCT Pub. No.: WO2019/162844
PCT Pub. Date: Aug. 29, 2019

(65) Prior Publication Data
US 2020/0393819 A1    Dec. 17, 2020

(30) Foreign Application Priority Data
Feb. 20, 2018 (IT) .......................... 102018000002832

(51) Int. Cl.
G05B 19/418 (2006.01)

(52) U.S. Cl.
CPC .................. G05B 19/41835 (2013.01); *G05B 2219/32023* (2013.01); *G05B 2219/32025* (2013.01); *G05B 2219/32392* (2013.01)

(58) Field of Classification Search
CPC .... G05B 19/41835; G05B 2219/32023; G05B 2219/32025; G05B 2219/32392; Y02P 90/02
(Continued)

(56) References Cited

U.S. PATENT DOCUMENTS 5,083,591 A * 1/1992 Edwards ........... B01F 15/00428
141/9
5,268,849 A 12/1993 Howlett et al.
(Continued)

FOREIGN PATENT DOCUMENTS

EP       3098674 A1 * 11/2016    ......... G05B 19/4189

OTHER PUBLICATIONS

Anonymous: "Build to order", Wikipedia—The Free Encyclopedia, Feb. 16, 2018. Available Online at: https://en.wikipedia.org/w/index.php?title=Build_to_order&oldid=826016512.
(Continued)

*Primary Examiner* — Kenneth M Lo
*Assistant Examiner* — Mohammed Shafayet
(74) *Attorney, Agent, or Firm* — Merchant & Gould P.C.

(57) ABSTRACT

A method automatically controls stores for a processing line for containers pre-dosed with fluid products. The identifying code for each container is determined and then checked whether the container is necessary for production orders received. The container is introduced into a first store and the quantity and identifying codes of the containers in the first store are recorded. Production orders are checked for products yet to be started. The containers are picked up and sent towards a first manipulation station and at least one production order of a product is processed and the containers are sent towards different stations. Quality control inspection is conducted and if the product is compliant, introduced into a second store. Containers with non-compliant product are
(Continued)

introduced into a control line. The quantity of containers in the second store is recorded and the containers are sent towards a packaging station to fulfill production orders.

11 Claims, 5 Drawing Sheets

(58) Field of Classification Search
USPC .......................................................... 700/83
See application file for complete search history.

(56) References Cited

U.S. PATENT DOCUMENTS

| | | | | |
|---|---|---|---|---|
| 6,425,226 | B1* | 7/2002 | Kirschner | B65G 1/1378 |
| | | | | 53/168 |
| 2010/0049537 | A1* | 2/2010 | Erie | G06Q 10/083 |
| | | | | 705/1.1 |
| 2013/0111849 | A1 | 5/2013 | Bush et al. | |
| 2014/0157732 | A1* | 6/2014 | Gasber | B65B 5/12 |
| | | | | 53/473 |
| 2015/0073587 | A1* | 3/2015 | Vliet | G05D 1/0212 |
| | | | | 700/216 |
| 2016/0078395 | A1* | 3/2016 | Schoening | G06Q 10/087 |
| | | | | 705/7.15 |
| 2017/0370041 | A1* | 12/2017 | Scatizzi | D06B 23/10 |

OTHER PUBLICATIONS

International Search Report and Written Opinion from International Application No. PCT/IB2019/051363, dated May 27, 2019.
International Preliminary Report on Patentability from International Application No. PCT/IB2019/051363, dated Jun. 15, 2020.

* cited by examiner

METHOD TO CONTROL STORES FOR A PROCESSING LINE FOR CONTAINERS THAT WERE PRE-DOSED WITH FLUID PRODUCTS

This application is a National Stage Application of International Application No. PCT/IB2019/051363, filed 20 Feb. 2019, which claims benefit of Serial. No. 102018000002832, filed 20 Feb. 2018 in Italy and which applications are incorporated herein by reference. To the extent appropriate, a claim of priority is made to each of the above-disclosed applications.

BACKGROUND

The present invention relates to an automated method to control stores comprised in a processing line for pre-dosed containers containing fluid products, such as paints and/or dyeing products, in particular to control stores respectively placed at the entrance and exit of a processing line.

SUMMARY OF THE INVENTION

In particular, the present invention relates to a control method for storing containers to be fed into the processing line, according to production orders, and also for storing the containers containing the desired fluid product, created by said processing line, to be sent to a packaging station, based on the actual completion of a production order.

Stores are known, preferably vertical ones, which are suitably automated to be able to store containers pre-dosed with fluid products in view of a possible production order.

The store control methods according to the state of the art essentially provide for computing the number of containers based on their different typologies in terms of dimensions and/or product contained therein, and for determining the store's filling state.

No store control method exists which allows a production order to be immediately started as soon as a sufficient number of containers have been stored in the store to fulfil that order, so that they can be sent towards a first manipulation station of a processing line in an automated manner, without requiring the intervention of an operator to verify the actual possibility of completing the order, on the basis of data relating to the containers stored in that store.

Also, no methods are known for controlling stores located in proximity to the exit of the processing line, upstream of a packaging station, which can store into the store the containers that have been processed and which have passed a quality control inspection, providing an indication when the number of containers necessary for carrying out the order is reached. Moreover, no store control methods are known which allow changing the priority order according to which production orders are to be executed and/or carried out, regardless of when such production orders have been received and/or executed.

Also, no store control methods are known which can manage the introduction of containers into a processing line for two distinct production orders, to be carried out in parallel.

The present invention aims at solving these and other technical problems and achieving numerous technical effects, by proving an innovative method to control stores for a processing line adapted to process pre-dosed containers containing fluid products.

One aspect of the present invention relates to a store control method.

A further aspect of the present invention relates to a processing line adapted to process pre-dosed containers containing fluid products.

BRIEF DESCRIPTION OF THE DRAWINGS

The features and advantages of the method and line according to the present invention will become apparent from the following description of some possible embodiments thereof and from the annexed drawings, wherein.

DETAILED DESCRIPTION OF THE INVENTION

Figure 1:
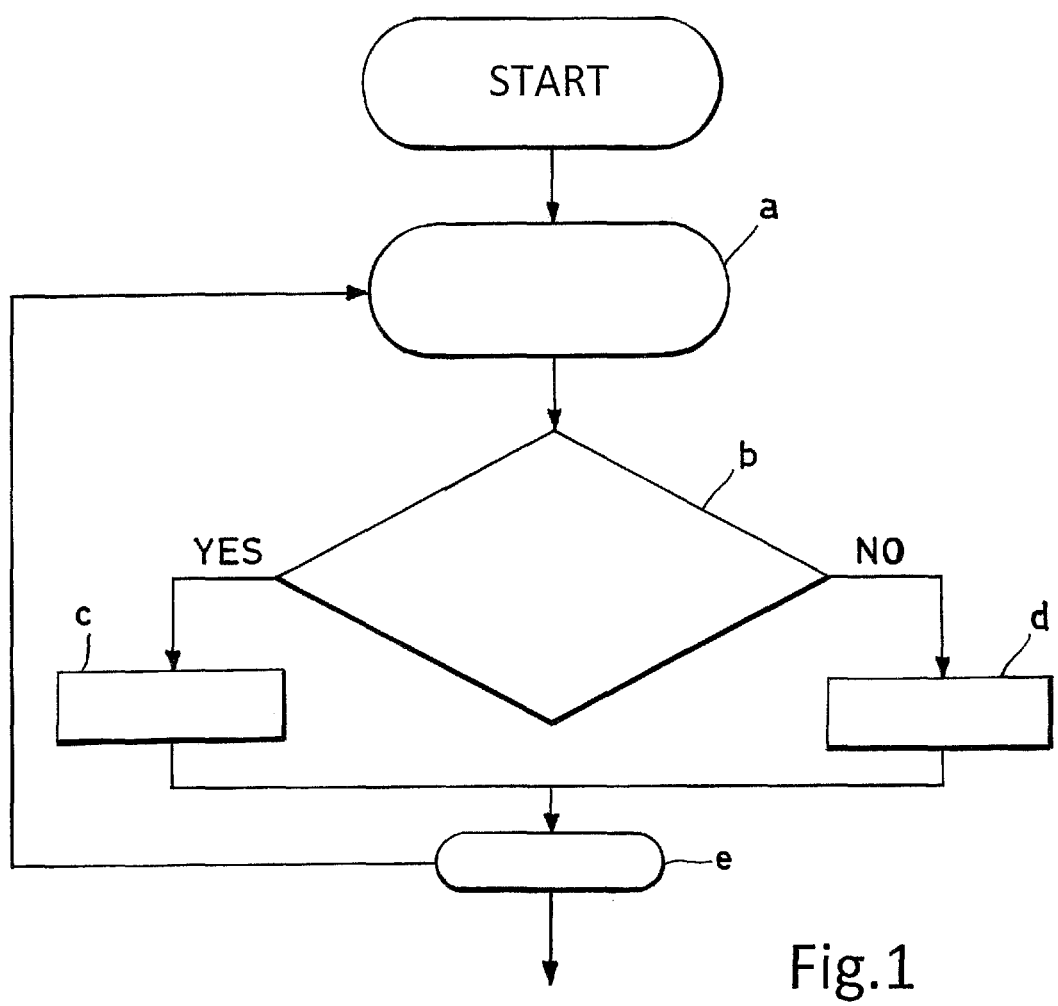
FIG. 1 shows a flow chart of one possible implementation of a sub-procedure for the entry of new containers into the processing line.

With reference to the above-listed figures, the method to control stores (M1, M2, M3) according to the present invention is particularly suited for application to a processing line 2 adapted to carry out a processing on pre-dosed containers "C", containing fluid products, wherein such containers "C" are preferably closed.

The control method according to the present invention is adapted to be carried out by a control system 1. Said control system 1 is adapted to control said processing line 2. Said control system 1 may be the control unit of processing line 2, being comprised therein.

Said processing line 2 is capable of processing one or more production orders "O" received, e.g. under supervision by said control system 1.

Containers "C" adapted to be handled by the method and processing line 2 according to the present invention comprise an identifying code "I". Said identifying code "I" is applied on container "C" itself. Said identifying code "I" relates, for example, to the content and/or the features of the same container "C". Such identifying code "I" is, for example, associated with container "C" as a bar code or a QR code, whether printed on the container or applied thereon by means of an adhesive.

Said identifying code "I" must at least provide the following information: size of container "C" and type of fluid product contained in said container "C".

Said identifying code "I" may also provide indications about the shape of container "C", the dimensions and type of the closing system of container "C", and other information useful for classifying containers "C" most appropriately based on their characteristics and the production orders that may possibly arrive.

The control method according to the present invention comprises the following steps, preferably to be carried out in succession:

determining said identifying code "I" for each container "C" entering processing line 2;

checking whether container "C" is necessary for one or more production orders "O" received, based on identifying code "I" of the container;

introducing container "C" into a first store "M1", in case the check on identifying code "I" reveals that container "C" is necessary to complete a production order "O" of a product "P", preferably not yet being executed by processing line 2;

recording the number and identifying codes "I" of containers "C" comprised in said first store "M1";

checking production orders "O" of different products "P" still to be started, processing a plurality of data resulting from the preceding computing step;

picking up said containers "C" from the first store "M1", e.g. on the basis of an algorithm determining the picking priority of said first store "M1", sending them towards a processing station of processing line 2, e.g. a first manipulation station 3, in case the number of containers "C" having an identifying code "I" capable of fulfilling a production order "O" is reached;

cyclically repeating the preceding steps for each container "C" entering processing line 2 and, at the same time, carrying out at least one production order "O" of a product "P" in said processing line 2, in particular by sending containers "C" towards the different stations of processing line 2, in particular processing stations "W" and/or manipulation stations (3, 5), in order to obtain desired product "P";

performing a quality control inspection on at least one container "C" comprising product "P" entering a checking station 7, assessing the compliance of product "P".

introducing container "C" into a second store "M2", in case the quality control inspection produces a compliant product "P" result;

introducing container "C" into a control line "K", in case the quality control inspection produces a non-compliant product "P" result;

recording the number of containers "C" having a product "P" on the inside and comprised in said second store "M2";

sending said containers "C" towards a packaging station "B", in case the number of containers "C" contained in said second store "M2" and having a product "P" on the inside is such as to fulfil said production order "O".

The control method according to the present invention is adapted to be carried out in a totally automatic manner. Said control system 1 is capable of controlling and managing the stations, the stores and the devices comprised in processing line 2 by executing the control method according to the present invention.

Said control system 1 comprises, in turn, at least one data processing unit and at least one memory medium, in which the steps of the present method are stored as a computer program. Control system 1 further comprises a memory medium storing the data received from the various elements comprised in processing line 2 according to the present invention.

In general, said stores (M1, M2, M3) are stores adapted to contain a plurality of containers "C". Said containers "C" may have different volumes and/or conformations, depending on the requirements of customers placing production orders "O" that can be carried out by means of processing line 2 according to the present invention.

Preferably, for space optimization reasons, said stores (M1, M2, M3) are vertical stores.

Each store comprises, inside of it, moving devices for picking up, internally moving and positioning containers "C". Said moving devices are preferably electromechanical ones and can be automatically controlled, e.g. by said control system 1. Preferably, said moving devices, e.g. lifting devices, conveyor belts or rollers and/or robotic arms, are controlled and/or managed by said control system 1 at least indirectly, e.g. by supervising a processing unit internal to the stores themselves.

Preferably, said stores (M1, M2, M3) are positioned as follows: a first store "M1" in proximity to the entrance of processing line 2, a second store "M2" in proximity to the exit of processing line 2, close to packaging station "B".

In an exemplary, but non-limiting, preferred embodiment, said processing line 2 comprises a third store "M3". Said third store "M3" being placed close to a checking station 7. In fact, said third store "M3" is adapted to contain the containers "C" which contain a product that was considered non-compliant, since it did not pass the quality control inspection. Said third store "M3" is preferably connected to a control line "K" into which containers "C" that have passed the quality control inspection are conveyed.

Control system 1 is capable of receiving a plurality of production orders "O". Such production orders "O" may be entered into the memory of control system 1 either in an automatic manner, e.g. via remote transmission, or manually by an entrusted operator, who can enter data acquired in paper form, e.g. based on oral requests from a customer, into an interface device, e.g. a personal computer.

Depending on the type of production order "O" received, e.g. depending on who placed the order, in particular the type of customer, or the number of containers specified in production order "O", control system 1 is adapted to manage stores (M1, M2, M3) in a dedicated manner, so that production orders can be started and/or completed, by setting different parameters and/or priority levels. For example, stores (M1, M2) are managed in such a way that the containers will be sent to the stations, e.g. the first manipulation station 3 or packaging station "B", as a function of the type of production order "O" and/or the type of customer that placed the order.

Through said control system 1, the control method according to the present invention is adapted to execute an algorithm capable of taking into account numerous parameters and the standards provided by the individual customers, changing the priority with which the production orders are started and/or carried out.

Moreover, processing line 2 according to the present invention can preferably receive containers "C" from one or more suppliers, and must be able to meet the requirements of a large number of customers.

In general, with each production order "O" control system 1 associates different states based on the conditions of the various stores and/or the products exiting the line.

For example, a production order "O" may have the following states:

not ready to be carried out—where the number of suitable containers "C" contained in the first store "M1" has not been reached yet;

ready to be carried out—where the number of suitable containers "C" in the first store "M1" has been reached, but production order "O" has not been taken over by processing line "2";

under execution—where production order "O" has been taken over by processing line 2, which is processing a plurality of containers "C";

discharged—where processing line 2, after a quality control inspection, aborts the continuation of the execution of the processing and/or the transfer to packaging station "B";

suspended—where processing line 2 at least temporarily suspends the execution of said production order "O".

As a function of the different states taken by various production orders "O" stored in control system 1, various production orders "O" are appropriately carried out and containers "C" are processed in said processing line 2.

Furthermore, control system 1 associates different states with each container "C" introduced into stores (M1, M2, M3) as a function of production orders "O" and/or the results of the quality test carried out on product "P" contained in single containers "C".

For example, a container "C" may have the following states:

free—in case container "C" has not been associated with any production order "O" stored in said control system 1;

reserved—in case container "C" has been associated with a production order "O" stored in said control system 1;

rejected—in case container "C" has been discarded because identifying code "I" cannot be associated with any production order "O" currently stored in the memory, or because it did not pass a quality control inspection.

In general, production orders "O" and the state thereof, as well as various containers "C" and the state thereof, are conveniently saved into a non-volatile memory medium managed by control system 1.

Control system 1 provides for analysing production orders "O" received, assigning to each one of them appropriate markers for determining the priority level thereof, with respect to orders already stored and processed by the control system. In order to determine the priority level, control system 1 can execute an algorithm capable of assigning a specific priority level for the execution of production order "O", e.g. based on the customer, the requested number of containers "C", etc.

Describing more in detail the control method according to the present invention, in order to carry out the step of determining said identifying code "I", said processing line 2 comprises an identification station 22. Said identification station 22 is at least adapted to identify and receive said identifying code "I" associated with each individual container "C".

The data determined by said identification station 22 are transmitted to control system 1, which is adapted to process and suitably save them.

Subsequently, during the step of checking whether container "C" is necessary for one or more production orders "O" received, control system 1 is adapted to compare identifying codes "I" with production orders "O" received.

If the verification of identifying code "I" reveals that container "C" is necessary to complete a production order "O" of a product "P", in particular a production order "O" not yet being executed by processing line 2, the method envisages to introduce container "C" into a first store "M1".

Control system 1 immediately associates the "free" state with the container "C" sent towards the first store "M1", so that it can be associated with a production order "O" having the "not ready to be carried out" state.

In this way, container "C" introduced into the first store "M1" is immediately taken into consideration by control system 1 and can be associated with a production order "O".

The control method according to the present invention preferably comprises a sub-step in which it is verified if the first store "M1" can receive any further containers "C". In this sub-step, if the first store "M1" has room and/or locations in which container "C" can be stored, control system 1 will cause container "C" to be sent to the first store "M1". Otherwise, container "C" will be rejected, since it cannot be housed in the first store "M1".

Control system 1 is therefore capable of interrupting the introduction of containers "C" into processing line 2.

In an exemplary, but non-limiting, preferred embodiment of the control method according to the present invention, if identifying code "I" of a container "C" is not necessary to complete a production order "O" of a product "P", then container "C" will be rejected and will not be allowed to continue along its path in processing line 2.

For example, if control system 1, by analysing all production orders "O" received, determines that for a specific type of identifying code "I" of containers "C" the number of containers "C" is already sufficient to fulfil all orders received, then the system will reject container "C". Rejection of a container "C" may also occur in case container "C" has an identifying code "I" that does not correspond to any production order received, stored in the memory and/or not yet carried out. In this situation as well, container "C" will be rejected, since there is no production order with which it can be associated.

In one possible exemplary alternative solution, control system 1 can save into the memory the most common production orders "O" as they are repeated most frequently. In this embodiment, even if control system 1 has not received a production order "O" concerning a specific identifying code "I", control system 1 will allow a container "C" having that specific identifying code "I" to enter said first store "M1", even though it will not be possible to assign container "C" to any production order "O" already received. In this embodiment, container "C" will be set aside, since it will be very likely that new production orders "O" will shortly arrive with which container "C" that has been set aside can be associated. This embodiment is used especially when the first store "M1" has many free locations in which the containers "C" can be stored.

In an exemplary embodiment, if the verification of identifying code "I" reveals that container "C" is necessary to complete a production order "O" of a product "P" already being executed by processing line 2, the control method envisages to send container "C" towards a first manipulation station 3 comprised in said processing line 2. In this case, control system 1 immediately associates the "reserved" state with container "C" and sends the container towards the first manipulation station 3, where it will undergo the processing required for obtaining desired product "P". This embodiment allows compensating for a possible reduction in the number of containers "C" used for carrying out a production order "O", e.g. because some of containers "C" allocated to that production order "O" have not passed the quality control inspection and/or have been removed from the line due to damage and/or incompleteness. This step is preferably carried out when a high-priority production order "O" is being executed.

This step may also be used in case production order "O" corresponds to a number of containers "C" equal to or greater than the maximum capacity of the first store "M1". In this case, if the first store is already full, container "C" identified as necessary to complete a production order "O" will be sent directly to the first manipulation station 3. Control system 1 will take into account the fact that one or more containers "C", necessary to complete a production order "O", have already been sent to the first manipulation station 3 of production line 2.

Therefore, in one possible embodiment of a sub-procedure of the control method according to the present invention, relating to the entry of new containers "C" into the processing line, control system 1 decides, based on production orders "O" under execution and/or ready to be carried out, and in light of identifying code "I" detected, whether to send container "C" towards said store "M1" or towards the first manipulation station 3.

In such an exemplary embodiment, if the verification of identifying code "I" reveals that container "C" is necessary to complete a production order "O" of a product "P" being already executed by processing line 2, the control method envisages to send container "C" towards a first manipulation station 3, which can be done also when the first store "M1" is not active, e.g. in case of a failure or malfunction thereof. This step thus allows the first store "M1" to be excluded from processing line 2.

Subsequently, the control method according to the present invention envisages the execution of the step of recording the number and identifying codes "I" of containers "C" comprised in said first store "M1".

As containers "C" are introduced into the first store "M1", control system 1 automatically updates the number of containers "C" loaded therein and the various subdivisions thereof according to identifying codes "I".

As aforementioned, the control method envisages that, at least initially, control system 1 associates a state called "Free" with each container "C" introduced into the first store "M1".

Subsequently, the method envisages the execution of the step of checking production orders "O" of different products "P" still to be started, processing a plurality of data resulting from the computation step.

Based on the results of the above-mentioned verification step, control system 1 will be able to carry out the appropriate next steps of the method.

In case the number of containers "C" having an identifying code "I" that can meet the requirements of a production order "O" has been reached, the method envisages to pick up said containers "C" from the first store "M1" and send them towards the first manipulation station 3.

In this step, control system 1 suitably activates the first store "M1", and in particular the moving devices comprised therein, so as to send containers "C" having the "reserved" state and associated with a production order "O", the state of which has been changed to "ready to be carried out", towards the first manipulation station 3 comprised in processing line 2.

If this is not the case, control system 1 will update the computation and the various states, in particular the states associated with containers "C" comprised in the first store "M1".

In general, the method according to the present invention comprises a step of assigning a state to each production order "O", which can be identified among: not ready to be carried out; ready to be carried out; under execution; discharged; and suspended.

Such states will have the above-specified characteristics. At each step of checking if container "C" is necessary, and at each step of recording the number and identifying codes "I" of containers "C", control system 1 can assign and/or update the states of containers "C" comprised in the first store "M1" and the saved production orders "O", being able to change them as the surrounding conditions change, e.g. when the number of containers "C" introduced into the first store "M1" changes and/or after the quality control inspection step. In fact, based on the variation in the number of containers "C" loaded into the first store "M1", the system will be able to evaluate whether the order is ready or not to be carried out, or whether to execute, discard or suspend the execution of a production order "O".

The control method according to the present invention comprises also a step of assigning a state to each container "C", which can be identified among: free; reserved; and rejected. Such states will have the above-specified characteristics. At each step of checking if the container "C" is necessary, and at each step of recording the number and identifying codes "I" of containers "C", control system 1 can assign and/or update the states of containers "C". The state associated with a container "C" may change as a function of the data resulting from the steps of the control method described above and/or after the quality control inspection step. In fact, control system 1 will be able to evaluate, based on the variation in the number of containers "C" loaded into the first store "M1", whether a production order "O" is ready or not to be carried out, and hence whether or not to change the state to "reserved" for a plurality of containers "C", so that a production order "O" can be carried out.

In general, when the number of containers "C" having a specific identifying code "I" is such as to meet the requirements of a production order "O", control system 1 will update the state of all containers "C" fulfilling that production order "O" and also that of production order "O", which can now be carried out. In fact, the "reserved" state will be associated with containers "C", and the state of production order "O" concerned will be changed to "ready to be carried out".

Control system 1 is adapted to execute a computation algorithm to change the priority of execution of production orders "O", e.g. in order to privilege large orders and/or orders to which urgent delivery has been assigned, e.g. as specified in production order "O". Preferably, the method according to the present invention envisages that said step of checking production orders "O" of various products "P" still to be started comprises a number of evaluation sub-steps. Such sub-steps are based on a suitable algorithm adapted to identify the priority of execution and/or completion of production orders "O" not yet started.

In one possible embodiment, said algorithm is adapted to give higher priority to large production orders "O", i.e. orders for a large number of containers and/or large volumes of product "P", which require much involvement and occupation of processing line 2, thereby ensuring that the processing line will be able to operate at full capacity for a long period of time.

As an alternative to or in combination with the above embodiment, said algorithm is adapted to give higher priority to orders placed via a multimedia channel over other types of channels through which control system 1 may receive production orders "O". In fact, production orders "O" received via a multimedia channel, although they normally concern small quantities of containers "C", give a higher profit margin, in addition to requiring advanced payment in advance of the total amount. Moreover, production orders "O" of this type, being smaller in size, allow for parallel execution of multiple production orders "O", through suitable allocation of the various processing stations "W" comprised in processing line 2.

As an alternative to or in combination with the above embodiments, said algorithm is adapted to assign priority levels on the basis of parameters specified in one or more production orders "O", in particular delivery specifications, e.g. logistic ones, and/or order delivery times.

In general, said algorithm may take into account the time when production orders "O" were received by control system 1, giving priority in accordance with the time of arrival.

The control method according to the present invention envisages that the steps and sub-steps described so far should be suitably carried out in a cyclical manner, for each container "C" fed into processing line 2.

The method of the present invention allows for dynamic and real-time management of production orders "O", reducing the downtimes of processing line 2 and eliminating the operators' discretionary power to make decisions about production orders "O" to be carried out.

The control method and processing line 2 according to the present invention allow storing containers "C" entering processing line 2 in an inventive manner, so that they can be innovatively sent towards the first manipulation station 3 of the processing line, an accumulation chamber function being provided in order to carry out production orders "O" received in an innovative way.

Therefore, in one possible embodiment of a sub-procedure for assigning and/or changing the states of containers "C" and production orders "O", control system 1 can, based on the containers introduced in the first store "M1", dynamically change the states of production orders "O" and containers "C" as a function of the variations occurred in the conditions under which processing line 2 is working, thus deciding whether or not to send containers "C" towards a station of processing line 2.

Along with the execution of the above cyclic steps, the control method according to the present invention comprises a step of executing at least one production order "O" of a product "P" in said processing line 2.

In one possible exemplary, but non-limiting, embodiment, said processing line 2 can simultaneously carry out a plurality of production orders "O" in order to make different products "P", based on identifying code "I" applied on each individual container "C". The present solution allows for parallel execution of different production orders "O", thus ensuring that the various stations of processing line 2 will work at full capacity, and avoiding any downtimes for one or more stations when they are not necessary for making product "P" under execution for a specific production order "O".

In one possible embodiment of processing line 2, it is particularly suited for processing fluid products contained in pre-dosed containers "C" containing fluid products.

Said container "C", adapted to be fed into processing line 2, in turn comprises at least one cover and/or one lid for closing container "C".

For the purposes of the present invention, the term fluid products refers to products such as paints, dyes and/or lacquers or bases for making surface-covering products.

For the purposes of the present invention, the term pre-dosed container refers to a container containing a quantity of fluids; therefore, it is not an empty container.

For the purposes of the present invention, the term cover and/or lid refers to a closing system capable of preventing the fluid product contained in the container from accidentally leaking out, when said cover and/or lid is coupled, in particular tightened, onto an opening comprised in at least a portion of the container and/or cover. Said opening may be an opening in the container itself or an opening formed on the lid, e.g. in case of a larger cover.

In addition to said at least one control system 1, processing line 2 according to the present invention comprises: a first manipulation station 3; the latter comprises, in turn, at least one manipulator, which is adapted to manipulate said cover and/or lid so as to remove said cover and/or lid from said container "C". The manipulation carried out by the manipulator on the cover and/or lid can open said container "C", in particular by decoupling, and in particular removing, said cover and/or lid from the opening with which they are associated. In particular, said manipulator can remove the cover and/or lid without damaging either container "C" or the cover and/or lid. Processing line 2 according to the present invention comprises a plurality of processing stations "W". Each processing station "W" is adapted to carry out at least one processing on the fluid product contained in container "C". Processing line 2 according to the present invention comprises processing stations "W" adapted to carry out the processing after said cover and/or lid have been removed from container "C". One possible processing that may be carried out by such a type of processing station is the addition of a further product, whether fluidic, solid and/or in granular form or in powder form, or the extraction of a sample, e.g. for a quality control inspection to be conducted on product "P" contained therein.

Furthermore, processing line 2 according to the present invention comprises processing stations "W" adapted to process sealed containers. One possible operation carried out by such a type of processing station is mixing and/or stirring.

For the purposes of the present description, processing a fluid product generally means executing a processing that can modify, at least partly, at least one characteristic of the fluid product contained in container "C".

processing line 2 according to the present invention comprises also a second manipulation station 5. Said manipulation station 5 comprises, in turn, at least one manipulator, which is adapted to manipulate said cover and/or lid, so as to associate said cover and/or lid with said container "C". The manipulation effected on the cover and/or lid by the manipulator can close said container "C", in particular by coupling, preferably tightening, said cover and/or lid onto the opening with which they must be associated. In particular, said manipulator can secure the cover and/or lid without damaging either container "C" or the cover and/or lid.

processing line 2 according to the present invention further comprises a transport system 8. Said transport system 8 is adapted to move pre-dosed containers "C" between different stations (3, 5, W). In general, said transport system 8 may describe a straight, broken or curvilinear path, according to specific requirements.

In processing line 2 according to the present invention, at least one processing station "W" is interposed between the first manipulation station 3 and the second manipulation station 5.

In a preferred embodiment of processing line 2 according to the present invention, the same processing line 2 comprises a system for moving the covers and/or lids. Said movement system is adapted to move the covers and/or lids at least between said first manipulation station 3 and said second manipulation station 5. Processing line 2 according to the present invention allows moving the covers and/or lids removed at the first manipulation station 3 up to the second manipulation station 5, so that the removed covers and/or lids can be reused. Preferably, in order to reduce the risk of contamination, the cover and/or lid removed from a container "C" at the first manipulation station 3 will be connected again to the same container "C" when the latter arrives at the second manipulation station 5.

Said processing line 2 is controlled and managed by said control system 1.

In one possible embodiment of processing line 2, it comprises one or more checking devices capable of performing checks on containers, e.g. checks for integrity of the container and/or cover and/or lid. Said checking devices are electronically connected to control system 1, so as to allow removing a container "C" for which a criticality is detected, e.g. non-integrity of the container or a part thereof.

processing line 2 comprises a station where an operator can communicate with said control system 1, e.g. a digital interface, e.g. a personal computer, for the purpose of signalling any anomalies in processing line 2. The operator is normally able to signal anomalies that cannot be detected by the checking devices. From this station, an operator can stop one or more steps of the control method and/or of the devices comprised in processing line 2 in order to be able to correct the detected fault, e.g. remove a damaged container.

Such operator-initiated signalling will be taken into account by control system 1, which will then take appropriate countermeasures. For example, if an operator removes a container "C" from processing line 2, control system 1 will provide for assigning a new container "C" to production order "O", by changing the state of that container "C" and sending it to the first manipulation station 3 in the predefined order.

The control method according to the present invention envisages that processing line 2 returns a plurality of containers "C" subjected to appropriate processing, so as to obtain desired product "P".

The same container "C", before being released by processing line 2, preferably undergoes a quality control inspection of product "P" contained therein.

The method according to the present invention comprises a step of performing a quality control inspection on at least one container "C" comprising product "P" entering a checking station 7, assessing the compliance of product "P".

processing line 2 further comprises a checking station 7. Said checking station 7 is adapted to check container "C" and/or product "P" contained therein. The inspection may be carried out on samples or on all containers "C" passing through processing line 2.

Said control system 1 is adapted to appropriately control said checking station 7, executing all necessary tests and returning data relating to the compliance of product "P" contained in each container "C" that has been inspected.

In one possible embodiment of the control method according to the present invention, in case of production orders for a number of containers greater than the maximum number of containers "C" that can be allocated into stores (M1, M2) of processing line 2, control system 1 is adapted to appropriately subdivide production order "O" into a plurality of subordinate production orders. Each subordinate production order is adapted to be fully processed by processing line 2 based on the capacity of various stores (M1, M2). In any case, such subordinate orders will refer to the large production order "O" from which they derive, and will be subject to the specifications of said large production order "O". In this respect, also the quality control inspection will be managed as if said plurality of subordinate production orders were a single production order. Therefore, if for such a production order "O" an in-depth quality control inspection is envisaged only on the first container "C" that arrives at said checking station 7, an in-depth quality control inspection will only be carried out on the first container of the first subordinate production order, all other containers "C" of all other subordinate production orders not being subjected to an in-depth quality control inspection.

The control method according to the present invention envisages that, if the quality control inspection produces a compliant product "P" result, container "C" will be introduced into a second store "M2".

During this step, compliant containers "C", i.e. those that contain a product compliant with the customer's requirements specified in production order "O", are sent into said second store "M2" to be then transferred to packaging station "B".

Control system 1 will suitably activate the second store "M2", so that it can store container "C" that has passed the quality control inspection.

The control method according to the present invention envisages that, if the quality control inspection produces a non-compliant product "P" result, container "C" will be introduced into a control line "K".

Control system 2 will suitably activate said control line "K" for conveying container "C" with a product not fulfilling the compliance requirements.

In one possible exemplary, but non-limiting, embodiment, the control method according to the present invention envisages that containers "C" introduced into control line "K" will then arrive at a third store "M3".

Said third store "M3" is managed by said control system 1 and its characteristics are similar to those of the above-mentioned first and second stores (M1, M2), but its dimensions are preferably smaller than those of the other stores. The third store "M3" is adapted to contain those containers "C" which have not passed, for whatever reason, the quality control inspection.

In one embodiment of the control method and processing line 2, containers "C" contained in said third store "M3" may be re-qualified, e.g. by trying to correct the detected problems that prevent container "C", and/or the contents thereof, from passing said quality control inspection. Therefore, containers "C" may be sent to a regeneration station comprised in processing line 2. At said regeneration station, it is possible to try to correct the deficiencies detected by checking station 7. Said regeneration station is preferably managed by said control system 1. From the regeneration station, container "C" may then be reintroduced into checking station 7 to be examined again.

In a preferred, though non-limiting, embodiment, if, during the execution of the steps of the control method according to the present invention for carrying out a production order "O" concerning a specific type of customer and/or order, a container "C" is rejected after the step of performing a quality control inspection, being thus discarded because it does not meet the quality requirements, then entire production order "O" will be suspended. In this embodiment, the control method envisages to change the state of that production order "O", e.g. to suspended or discharged. In this situation, the control method according to the present invention preferably envisages to change the state of containers "C" contained in store "M1", in particular containers "C" associated with that production order "O", from "reserved" to "free" again.

control system 1 is therefore adapted to change the state of containers "C" and production orders "O" as a function of the data returned by said checking station 7.

In this embodiment, the control method according to the present invention allows leaving such containers "C" available for the execution of other production orders "O". This solution makes it possible to dynamically control the execution of various production orders "O".

As previously specified, those containers "C" that have passed the quality control inspection are sent towards the second store "M2".

The method preferably comprises a sub-step wherein it is verified if the second store "M2" can receive any further containers "C". If the second store "M2" has room and/or locations for storing container "C", then control system 1 will cause container "C" to be sent to the second store "M2".

Otherwise, control system 1 will temporarily interrupt, or slow down, the feeding of containers "C" to the second store "M2" and also the preceding operations and/or steps of the processing line and/or of the control method, for the purpose of not causing any jams in processing line 2.

The second store "M2" is connected to a packaging station "B".

Said packaging station "B", comprised in processing line 2, is adapted to receive containers "C" exiting said second store "M2". Said packaging station "B" being controlled and managed by said control system 1.

Therefore, in one possible embodiment of a sub-procedure concerning the management of checking station 7 for the execution of the quality control inspection, control system 1 decides, based on the data returned by checking station 7 about the compliance of the product contained in containers "C", whether to send container "C" towards said second store "M2" or towards control line "K".

In one possible exemplary, but non-limiting, embodiment, the control method envisages to send container "C" directly towards a packaging station "B" comprised in said processing line 2.

This step may be used in case production order "O" corresponds to a number of containers "C" equal to or greater than the maximum capacity of the second store "M2". In this case, if the second store "M2" is already full, the container containing a product "P" that fulfils said production order "O" will be sent directly to packaging station "B". Control system 1 will take into account the fact that one or more containers "C", necessary to complete a production order "O", have already been sent to packaging station "B".

This step may be executed in case the second store "M2" is not active, e.g. due to failures or malfunctions. This step makes it possible, therefore, to exclude the second store "M2" from the processing line.

Therefore, the control method and/or processing line 2 are capable of excluding one or more stores (M1, M2) in the event that they are not active, e.g. because they are faulty or under repair.

Subsequently, the control method according to the present invention envisages the execution of a step of recording the number of containers "C" containing a product "P" that are comprised in said second store "M2". The present step allows updating the number of containers and of various products "P" contained in said second store "M2" that have passed the quality control inspection. Control system 1 will update the data about the number of containers for the different possible products.

The method according to the present invention envisages that, if the number of containers "C" containing a product "P" fulfils said production order "O", said containers "C" will be sent towards packaging station "B".

The present step allows containers "C" to be sent in an orderly manner towards packaging line "B" in the most appropriate sequence, to be then packaged and shipped to the customer, as concerns a specific production order "O" with which such containers "C" had been associated. This makes the procedure considerably simpler, since all containers and/or pallets will be ready to be shipped to a customer, thus avoiding the need for subsequently storing any products already packaged, e.g. on pallets, prior to shipping. Moreover, the present solution allows production orders to be carried out according to a predefined sequence, e.g. allowing for constant packaging of containers while still continuing the execution of production orders "O".

control system 1 can suitably activate the moving devices of the second store in order to conveniently send them towards said packaging station "B".

In an exemplary, but non-limiting, preferred embodiment, the method according to the present invention envisages that said packaging station "B" comprises moving devices. Said moving devices are capable of channeling containers "C" coming from said second store "M2".

Said moving devices of packaging station "B", comprised in processing line 2, have a predetermined number of stations.

In this way, packaging station "B" can manipulate containers "C" to create a package, e.g. a pallet, having the dimensional characteristics and/or specifications requested by the customer in production order "O".

The control method according to the present invention envisages that the step of sending said containers "C" towards a packaging station "B" is only carried out when at least one of said moving devices of packaging station "B" has at least one location available, preferably at least three.

In an exemplary, but non-limiting, preferred embodiment of processing line 2, said packaging station "B" comprises at least two moving devices. Preferably, a first moving device is adapted to receive the containers for large production orders "O". Preferably, a second moving device is adapted to receive containers for small production orders "O".

The two moving devices have different conformations, so that they can fulfil the different packaging requirements due to the different dimensions of production orders "O".

In general, said moving systems have predefined dimensions for containing a predefined number of containers "C". Control system 1 is adapted to cause the second store "M2" to send containers "C" towards the respective moving devices of packaging station "B" until all locations have been filled. Once such locations have been filled, control system 1 will wait before sending a container "C" towards the respective moving device until at least one station becomes available again on that moving device. Preferably, in order to send containers "C" for a new production order "O" towards said packaging station "B", control system 1 is adapted to cause the second store "M2" to send containers "C" towards the respective moving device of packaging station "B" only when at least three locations are available on that moving device.

Figure 5:
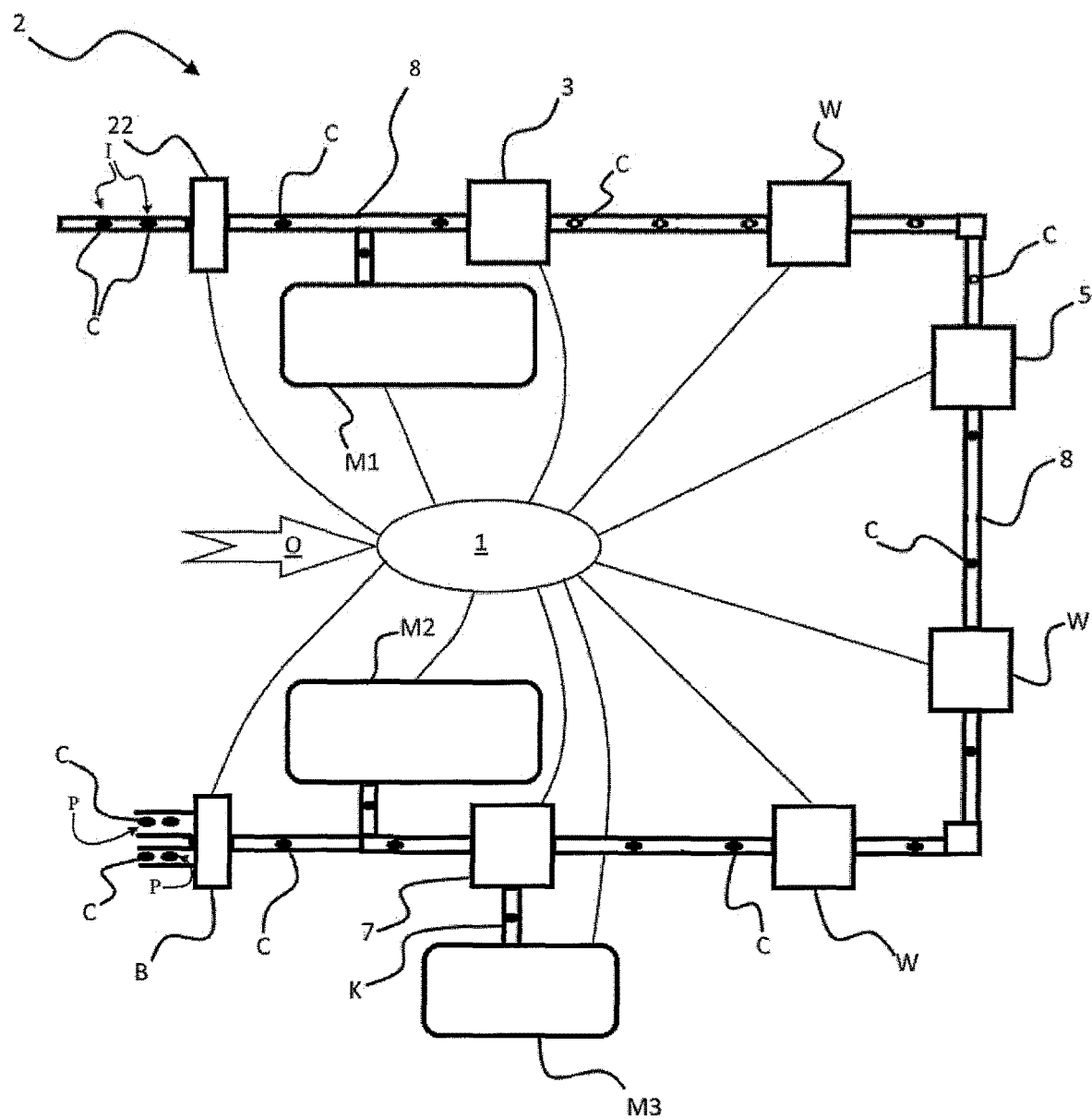
FIG. 5 schematically shows one possible embodiment of a processing line according to the present invention.

The present solution prevents parts of processing line 2 from becoming jammed and/or choked.

processing line 2 according to the present invention is adapted to carry out a control method according to the present invention through said control system 1. FIG. 5 schematically shows one possible exemplary, but non-limiting, embodiment of processing line 2 according to the present invention, controlled by a control system 1.

Said processing line 2 comprises an identification station 22, whereat a plurality of containers "C" arrive. Said identification station 22 is adapted to determine identifying codes "I" associated with the single containers "C". Downstream of identification station 22, containers "C" may be directed, by means of a transport system 8, either towards a first store "M1" or towards the first manipulation station 3, depending on the verifications made by the control method according to the present invention. Containers "C" exiting said first manipulation station 3 are open containers, from which the cover and/or lid has been removed. Downstream of the first manipulation station 3 there is at least one processing station "W" capable of dosing a further product, whether in fluidic and/or powder form, into said container "C". Subsequently, container "C" is sent towards a second manipulation station 5, which is adapted to close said containers "C" by associating therewith a cover and/or lid.

processing line 2 further comprises other processing stations "W" capable of carrying out operations, such as mixing or stirring, on the product contained in container "C".

Subsequently, container "C" is sent towards a checking station 7. Said checking station 7 is adapted to perform a quality control inspection on product "P" contained in container "C".

Downstream of checking station 7 there are a second store "M2" and a control line "K" connected to a third store "M3". Container "C" will be appropriately directed as a function of the verifications made by the control method according to the present invention.

Downstream of the second store "M2" there is a packaging station "B". Said packaging station "B" is adapted to prepare the pallets for shipping the completed production orders "O".

control system 1 is electronically connected to all stations and devices comprised in processing line 2 to control and manage said processing line 2 in accordance with the control method of the present invention.

Said control system 1 receives production orders "O" coming from one or more customers, transmitted to said control system 1 via one or more channels, e.g. a multimedia channel.

FIG. 1 shows a flow chart of one possible implementation of the sub-procedure for the entry of new containers "C" into processing line 2.

Said sub-procedure pertaining to the entry of new containers "C" into processing line 2 substantially corresponds to, and at least includes, the steps of: determining said identifying code "I"; checking if container "C" is necessary; and introducing container "C" into a first store "M1" in case container "C" is necessary to complete a production order "O", of the control method according to the present invention as previously described.

The illustrated embodiment includes the following successive steps:
  a. determining said identifying code "I" for each container "C" entering processing line 2;
  b. checking if container "C" is necessary to complete a production order "O" of a product "P" already being carried out by processing line 2;
  c. if yes, sending container "C" towards a first manipulation station 3, comprised in said processing line 2;
  d. if not, introducing container "C" into a first store "M1";
  e. cyclically repeating the preceding steps for each container "C" introduced into processing line 2, while at the same time proceeding with the remaining part of the control method according to the present invention.

The present sub-procedure allows containers "C" to be conveniently introduced either into the first manipulation station 3 or into the first store "M1".

The present sub-procedure may comprise a verification step wherein a container "C" is rejected in case container "C" cannot be associated with any production order "O". Step "a" is carried out by means of said identification station 22.

The steps of the present sub-procedure are carried out by control system 1.

Figure 2:
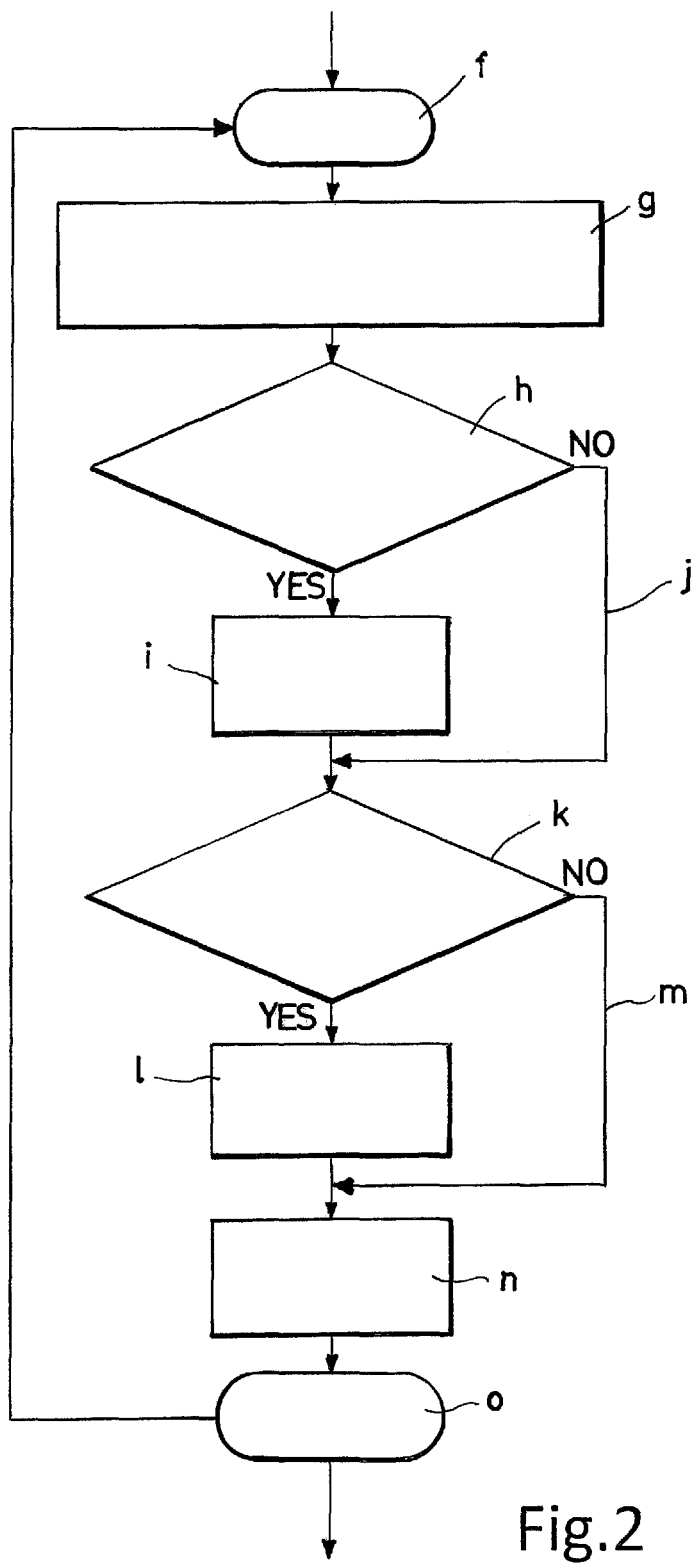
FIG. 2 shows a flow chart of one possible implementation of a sub-procedure for assigning and/or changing the states of containers and production orders.

FIG. 2 shows a flow chart of one possible implementation of the sub-procedure for assigning states to containers "C" and production orders "O".

Said sub-procedure for assigning states to containers "C" and production orders "O" substantially corresponds to the steps of: recording the number and identifying codes "I" of containers "C" comprised in said first store "M1"; checking production orders "O" of various products "P" still to be started; picking up said containers "C" from the first store "M1", sending them towards the first manipulation station 3; and cyclically repeating the preceding steps for each container "C" introduced into processing line 2, of the control method according to the present invention as previously described.

The illustrated embodiment includes the following successive steps:
  f. receiving container "C" into said first store "M1";
  g. recording the number and the identifying codes "I" of containers "C" comprised in said first store "M1";
  h. checking production orders "O" of various products "P" still to be started: is there a production order "O" still to be started that can be completely fulfilled?;
  i. if yes, assigning the "reserved" state to all containers "C" necessary to fulfil production order "O", while the corresponding production order is assigned the "ready to be carried out" state;
  j. if not, jumping directly to step "k";
  k. checking production orders "O" of various products "P" still to be started: is there a large production order "O" still to be started that can be completely fulfilled?;
  l. if yes, assigning the "reserved" state to all containers "C" necessary to fulfil production order "O", while the corresponding large production order is assigned the "ready to be carried out" state;
  m. if not, jumping directly to step "n";
  n. said containers "C" having the "reserved" state, assigned to a production order "O" having the "ready to be carried out" state will be picked up from the first store "M1" and sent as soon as possible towards the first manipulation station 3;
  o. cyclically repeating the preceding steps for each container "C" introduced into the first store "M1", while at the same time proceeding with the remaining part of the method.

In general, the containers that cannot be associated with a production order "O" to completely fulfill it will preferably remain in the "free" container state.

The present embodiment of the sub-procedure provides for assigning a state to containers "C" and to production orders "O" as a function of containers "C" comprised in said first store "M1", and may include one possible embodiment of the algorithm for assigning containers "C" to various production orders "O" that have arrived at control system 1 according to the present invention.

Alternative embodiments envisage verification steps wherein orders placed by a particular customer and/or received via a particular channel, e.g. multimedia channels, are privileged.

Figure 3:
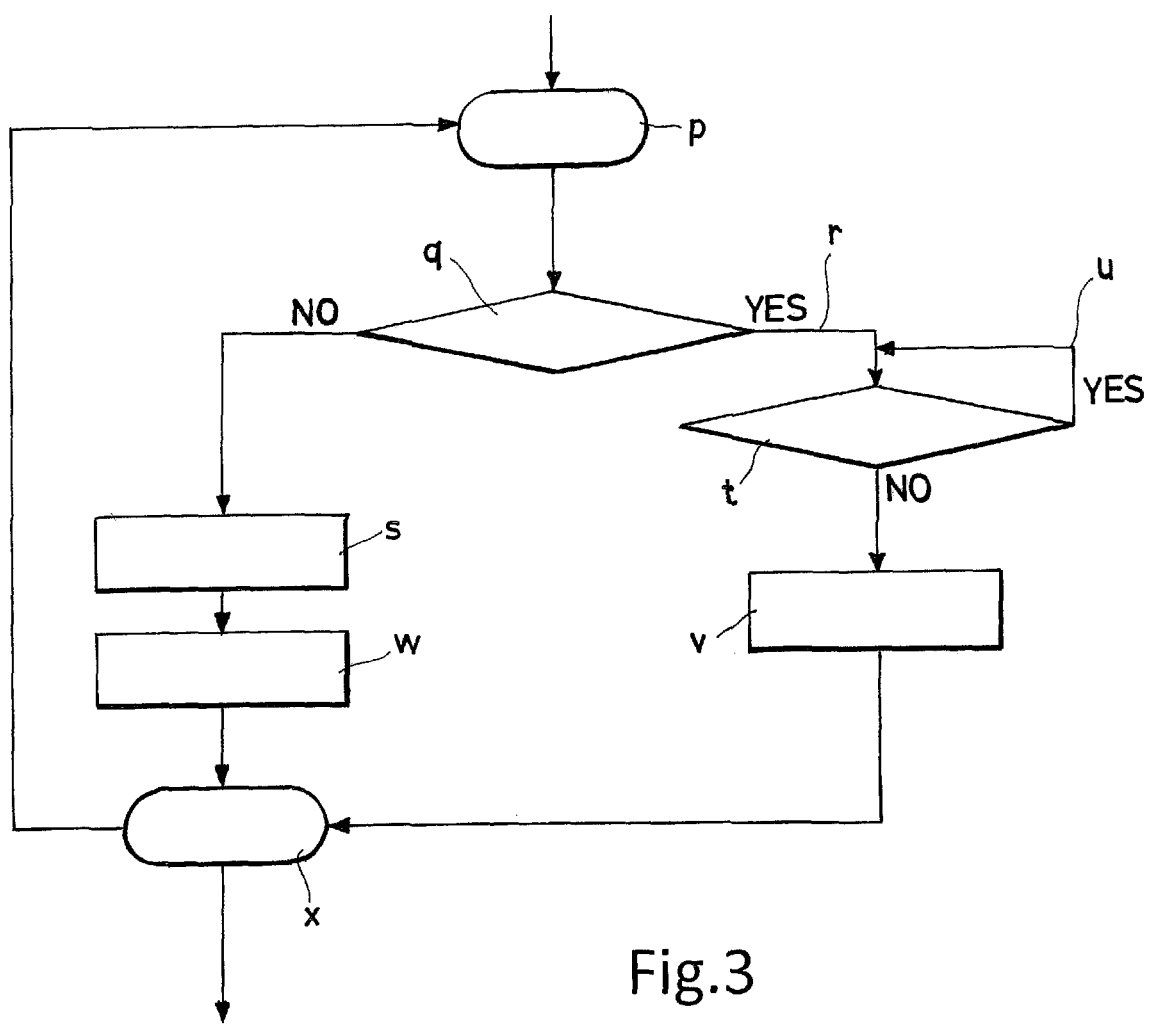
FIG. 3 shows a flow chart of one possible implementation of a sub-procedure for controlling and managing the checking station for the execution of the quality control inspection.

FIG. 3 shows a flow chart of one possible implementation of the sub-procedure for managing checking station 7 for the execution of the quality control inspection.

Said sub-procedure for managing checking station 7 substantially corresponds to the steps of: performing a quality control inspection; introducing container "C" into a second store "M2", in case the quality control inspection produces a compliant product "P" result; and introducing container "C" into a control line "K", in case the quality control inspection produces a non-compliant product "P" result, of the control method according to the present invention as previously described.

The illustrated embodiment includes the following successive steps:

p. performing a quality control inspection on at least one container "C" comprising product "P" entering a checking station 7;

q. assessing the compliance of product "P": is product "P" contained in container "C" compliant?;

r. if yes, sending container "C" towards the second store "M2";

s. if not, sending container "C" towards the control line "K";

t. after step "r", assessing the state of the second store "M2": is the second store "M2" full?;

u. if yes, repeating step "t";

v. if not, introducing container "C" into the second store "M2";

w. after step "s", introducing container "C" into said third store "M3" and, as concerns containers "C" still present in the first store "M1" and associated with the same production order "O", changing their state to "free";

x. cyclically repeating the preceding steps for each container "C" introduced into checking station 7, while at the same time proceeding with the remaining part of the control method.

The above-described sub-procedure represents one possible implementation of the management of containers "C" following the quality control inspection, particularly in case container "C" has not passed the quality control inspection.

In an alternative embodiment, containers "C" that have not passed the quality control inspection are sent directly to an exit line, without any further examination and/or re-qualification attempts.

As an alternative, the sub-procedure may envisage a manual check carried out by an operator prior to definitively rejecting container "C" that has not passed the quality control inspection.

Figure 4:
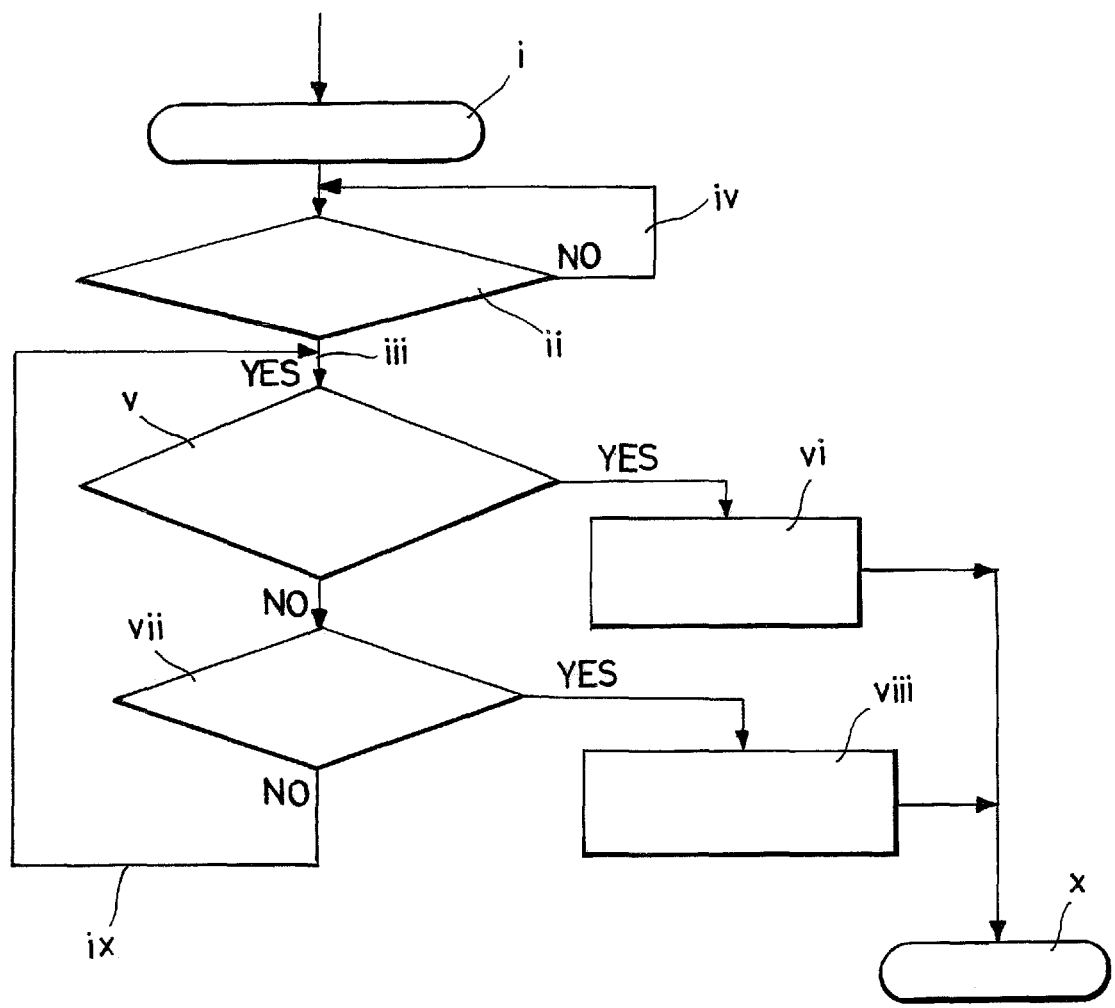
FIG. 4 shows a flow chart of one possible implementation of a sub-procedure for handling the containers to be sent to a packaging station.

FIG. 4 shows a flow chart of one possible implementation of the sub-procedure for handling containers "C" to be sent to a packaging station "B".

Said sub-procedure for handling containers "C" to be sent towards a packaging station "B" substantially corresponds to the steps of: recording the number of containers "C" having a product "P" on the inside and comprised in said second store "M2"; and sending said containers "C" towards a packaging station "B" in case the number of containers "C" fulfills said production order "O", of the control method according to the present invention as previously described.

The illustrated embodiment includes the following successive steps:

i. recording the number of containers "C" having a product "P" on the inside and comprised in said second store "M2";

ii. is the number of containers "C" having a product "P" on the inside sufficient to completely fulfill said production order "O" ?;

iii. if yes, sending said containers "C" towards a packaging station "B";

iv. if not, repeating step "ii";

v. checking the state of packaging station "B": is there at least one location available for small production orders "O" ?;

vi. if yes, sending a container "C" towards the free location in the lane for small production orders "O";

vii. if not, checking the state of packaging station "B": is there at least one location available for large production orders "O" ?;

viii. if yes, sending a container "C" towards the free location in the lane for large production orders "O";

ix. if not, repeating step "v";

x. after step "vi" or "vii", executing the step of packaging containers "C".

The present sub-procedure represents one possible implementation of the sub-procedure for handling containers "C" to be sent to a packaging station "B".

The control system is adapted to send containers "C" of various production orders "O" towards the appropriate lane of packaging station "B" according to the characteristics of production order "O" that can be carried out.

Alternative embodiments of the control method and processing line 2 according to the present invention, which may be easily conceived in the light of the above description and of the annexed drawings, should be considered to fall within the protection scope granted to the present patent application.

REFERENCE NUMERALS

Control system 1
Processing line 2
Identification station 22
Manipulator 4
Second manipulation station 5
Checking station 7
Transport station 8
Packaging station B
Containers C
Identifying code I
Control line K
First store M1
Second store M2
Third store M3
Production order O
Product P
Processing station W

The invention claimed is:

1. An automated method for controlling stores for a processing line for at least one container of a plurality of containers:

the plurality of containers are pre-dosed with fluid products having different volumes and compositions corresponding to one or more production orders of one or more desired products received from one or more customers and carried out by the processing line, wherein a desired product of the one or more desired products is prepared by processing a pre-dosed fluid product of the pre-dosed fluid products contained inside the at least one container of the plurality of containers;

the stores comprising the at least one container and first moving devices within the store, wherein the at least one container is closed, wherein the first moving devices are configured to pick up, internally move, and position the at least one container;

controlling the processing line using a control system, wherein the automated method is adapted to be carried out by the control system, wherein the control system is adapted to control the processing line;

applying identifying code to each of the at least one container of the plurality of containers, wherein the identifying code describes a set of identifying information relating to the corresponding at least one container;

the method comprising following consecutive steps:
a) determining the identifying code of each of the at least one container of the plurality of containers entering the processing line;
b) checking, whether the at least one container entered the processing line is necessary for a production order of the one or more production orders based on the identifying code of the corresponding at least one container that entered the processing line;
c) introducing the at least one container to a first store from the processing line if the identifying code reveals that the corresponding at least one container is necessary to complete the production order;
d) cyclically repeating the preceding steps a) through c) for the each of the at least one container entering the processing line, and at the same time, proceeding with following steps;
e) recording a first recorded quantity of the at least one container comprised in the first store and recording the identifying code of each of the corresponding at least one container comprised in the first store;
f) checking, if there are additional ones of the one or more production orders that are waiting to be started, and processing a plurality of data resulting from the preceding steps;
g) picking up the at least one container from the first store by the first moving devices, sending the at least one picked up container from the first store towards a processing station in the processing line if the first recorded quantity of the at least one container in the first store, having the identifying code capable of fulfilling the production order, is sufficient to complete the production order;
h) cyclically repeating the preceding steps e) through g) for the each of the at least one container introduced into the first store, and at the same time, proceeding with following steps;
i) performing a quality control inspection on the at least one container comprising the desired product entering a checking station to assess compliance of the desired product;
j) introducing the at least one container from the checking station to a control line if the quality control inspection produces a first result that indicates that the desired product inside the at least one container is non-compliant;
k) if the quality control inspection produces a second result that indicates that the desired product inside the at least one container is compliant, performing at least one of a following step:
 i. sending the at least one container directly to a packaging station in the processing line to fulfill the production order when the second store has been excluded from the processing line because the second store is not active, or
 ii. introducing the at least one container from the checking station to a second store when it is determined that the second store is not full, or
 iii. sending the at least one container directly to the packaging station in the processing line to fulfill the production order when it is determined that the second store is already full;
l) recording within the second store, a second recorded quantity of the at least one container in the second store having the desired product inside;
m) sending the at least one container from the second store towards a packaging station if the second recorded quantity of the at least one container in the second store having the desired product inside is sufficient to fulfill the production order;
n) cyclically repeating the preceding steps i) through m) for the each of the at least one container entering the checking station, and at the same time, carrying out the one or more production orders in the processing line.

2. The method according to claim 1, wherein in the step f), the additional ones of the one or more production orders that are waiting to be started comprises evaluation steps that are based on an algorithm adapted to identify a priority for executing and/or processing of the additional ones of the one or more production orders that are waiting to be started.

3. The method according to claim 2, wherein the priority identified from the algorithm is adapted to prioritize one of:
a large production order of the one or more production orders,
production orders of the one or more production orders that are received via a multimedia channel, or
production orders of the one or more production orders according to parameters provided in the one or more production orders.

4. The method according to claim 1, wherein the processing line simultaneously carries out the one or more production orders to provide the one or more desired products based on the identifying code applied to the each of the at least one container of the plurality of containers.

5. The method according to claim 1, wherein the method comprises rejecting the at least one container if the identifying code of the at least one container that entered the processing line is not necessary to complete the production order.

6. The method according to claim 1, wherein the method comprises sending the at least one container from the processing line towards a first manipulation station in the processing line if the identifying code in step b) reveals that the at least one container is necessary to complete a production order of the one or more production orders that is already being carried out by the processing line.

7. The method according to claim 1, wherein the at least one container introduced into the control line reaches a third store.

8. The method according to claim 1, wherein the packaging station comprises second moving devices that channel the at least one container coming from the second store, and the second moving devices comprise a predetermined number of stations;
wherein the sending the at least one container towards the packaging station is carried out only if at least one of the second moving devices of the packaging station has at least one free station out of the predetermined number of stations.

9. The method according to claim 1, wherein the method comprises a step of assigning a classification to each production order of the one or more production orders to generate a set of production order classifications, wherein the set of production order classifications comprise a first group of production orders of the one or more production orders that are not ready to be carried out, a second group of production orders of the one or more production orders that are ready to be carried out, a third group of production orders of the one or more production orders that are under execution, a fourth group of production orders of the one or more production orders that are discharged, and a fifth group of production orders of the one or more production orders that are suspended;

wherein the production order is assigned to the first group if the first recorded quantity indicates that number of the at least one container in the first store capable of fulfilling the production order has not been reached yet;

wherein the production order is assigned to the second group if the first recorded quantity indicates that number of the at least one container in the first store capable of fulfilling the production order has been reached, but the production order has not been started by the processing line;

wherein the production order is assigned to the third group if the production order has been started by the processing line;

wherein the production order is assigned to the fourth group if the processing line, after the quality control inspection, aborts continuation of execution of processing of the at least one container and/or performs the sending of the at least one container to the packaging station;

wherein the production order is assigned to the fifth group if the processing line temporarily suspends execution of the production order.

10. The method according to claim 1, wherein the method comprises a step of assigning a state to each of the at least one container that is defined as a free state, a reserved state, or a rejected state;

wherein the at least one container is assigned to the free state if the at least one container has not been associated with any of the one or more production orders;

wherein the at least one container is assigned to the reserved state if the at least one container has been associated with a production order of the one or more production orders;

wherein the at least one container is assigned to the rejected state if the at least one container has been discarded by the processing line.

11. The processing line for the plurality of containers that were pre-dosed with the fluid products, adapted to carry out the method according to claim 1, wherein the processing line comprises:
the control system to carry out the automated method;
an identification station;
the first store, adapted to contain the at least one container of the plurality of containers that is necessary to complete the production order received from the identification station;

at least one transport system, the at least one transport system adapted to move the at least one container between the different stations;

at least one first manipulation station comprising at least one manipulator, the at least one manipulator adapted to manipulate a cover and/or lid associated with the at least one container to remove the cover and/or the lid from the at least one container;

a plurality of processing stations, each of the processing stations are adapted to carry out at least one process on the pre-dosed fluid product contained in the at least one container;

at least one second manipulation station, which comprises at least one second manipulator, wherein the at least one second manipulator is adapted to manipulate the cover and/or the lid of the at least one container to associate the cover and/or the lid with the at least one container;

the checking station, wherein the checking station is adapted to perform the quality control inspection on the at least one container entering the checking station and/or adapted to perform the quality control inspection on the desired product contained in the at least one container entering the checking station;

the second store, wherein the second store is adapted to receive the at least one container containing the compliant desired product when the second store is not excluded from the processing line and when the second store is not full;

the control line, wherein the control line is adapted to receive the at least one container containing the non-compliant desired product;

the packaging station, the packaging station is adapted to pack the at least one container received by the packaging station from the second store or from the checking station, wherein
the packaging station is adapted to receive the at least one container from the second store when the second store is not excluded from the processing line and when the second recorded quantity is sufficient to fulfill the production order, or
the packaging station is adapted to receive the at least one container directly from the checking station when the second store is excluded from the processing line, or when the second store is already full.

* * * * *